No. 834,372. PATENTED OCT. 30, 1906.
G. DUNHAM.
METHOD OF MAKING HEXAGONAL NUTS.
APPLICATION FILED MAY 7, 1906.

Witnesses.
S. H. Clarke
P. J. Egan

Inventor.
George Dunham
By James Shepard
Atty.

UNITED STATES PATENT OFFICE.

GEORGE DUNHAM, OF UNIONVILLE, CONNECTICUT.

METHOD OF MAKING HEXAGONAL NUTS.

No. 834,372.  Specification of Letters Patent.  Patented Oct. 30, 1906.

Application filed May 7, 1906. Serial No. 315,569.

*To all whom it may concern:*

Be it known that I, GEORGE DUNHAM, a citizen of the United States, residing at Unionville, in the county of Hartford and State of Connecticut, have invented certain new and useful Improvements in the Method of Making Hexagonal Nuts, of which the following is a specification.

My invention relates to the method of making hexagonal nuts from a flat bar of metal by means of dies and punches; and the object of my improvement is economy of production by facilitating the manufacture and at the same time to produce a smooth nut.

Figure 1:
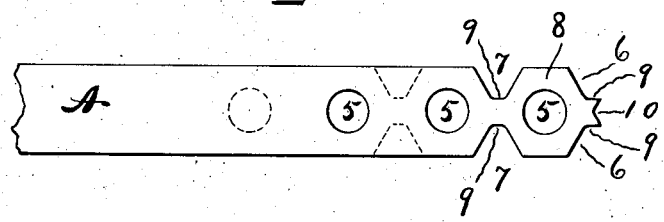
Figure 2:
Figure 3:
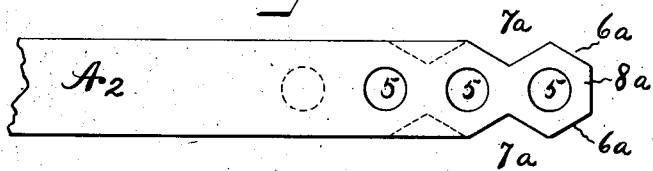
Figure 4:

In the accompanying drawings, Figure 1 is a plan view of a bar of metal, illustrating the first step in my method of making nuts therefrom. Fig. 2 is a plan view of a nut as severed from the end of the bar shown in Fig. 1. Fig. 3 is a plan view of a bar of metal, illustrating the first step in my method of making nuts with the sides of the nuts differently related to the bar of metal. Fig. 4 is a plan view of a nut as severed from the end of the bar, Fig. 3.

My method is particularly applicable to making nuts from a bar of metal by means of a gang of dies and punches which form the round hole, blank out the nut, and then trim the sides thereof, and by my improvement all the necessary feed to produce a trimmed nut may be produced by a simple feed of the bar and without any carrier or transferring device, whereby an automatic machine is very much simplified and a superior nut or nut-blank is produced economically.

A designates a flat bar of metal, which is about the same width as the intended nut-blank, measured centrally from side to side of its parallel edges. The ordinary round holes 5 are punched centrally with reference to each intended nut-blank. At the end of the bar the faces 6 6 represent one side of substantially a V-shaped notch, a complete one of the said notches 7 being formed on opposite side edges of the bar, as shown at the left of the partly-formed nut-blank 8 at the end of the bar. Each of these notches 7 is in the form of an acute-angled V, with a truncated bottom or apex 9. The small notch 10 in the end of the bar was formed by one corner of the trimming-die in trimming and severing a nut or nut-blank from the bar. I employ a round-hole die and punch, a pair of notching-dies and punches, and a trimming-die and punch. If these are arranged in a gang for acting simultaneously at each blow of the press or machine, the operation is as follows:

The bar is fed in from the left and its right-hand end placed in position over the round-hole die for punching the hole for the first nut-blank on the end of the bar. The bar is then fed along the width of one nut for punching the second round hole, and at the same time the two corners of the bar will be cut off by the notching-dies and punches, leaving the faces 6 6. The bar is then moved along the proper distance for another nut-blank, and the third round hole 5 and the pair of notches 7 will be cut, and at the same time the notch 10 will be formed in the end of the bar by the trimming-die and punch, if any metal comes within their range. The bar at this stage is represented in Fig. 1 with the nearly-completed nut-blank 8 formed on the end of the bar and with sufficient stock between the bottom of the two notches 7 to enable the blank 8 to be carried into position over the trimming-die by merely feeding the bar along. At the next blow of the press another round hole and pair of notches will be formed, as indicated by broken lines in Fig. 1, and at the same time the blank 8 will be trimmed by the trimming-die and punch and also severed from the bar, as shown in Fig. 2.

Heretofore it has been the practice in making hexagonal nuts to sever the nut-blanks from the bar before they are trimmed, and thus it will be seen that they cannot be fed to the trimming-die by merely feeding the bar along.

The method illustrated in Figs. 3 and 4 is the same, only the nuts are differently related to the bar $A^2$, which is wider than the bar A, so as to correspond with the dimensions of a nut-blank measured from corner to corner instead of from side to side. The notches $7^a$ are not truncated at the apex and the faces $6^a$ $6^a$ are formed on the partly-formed nut-blank $8^a$ by the first sides of the notching-dies and punches. The broken lines indicate the same in Fig. 3 as in Fig. 1, and the description of the operation in connection with Figs. 1 and 2 applies equally well to Figs. 3 and 4. In both cases the first step in the method is to produce a partially-formed nut-blank on the end of the bar by cutting the opposite edges of the bar on oblique lines corresponding to the confronting edges of two adjoining nut-blanks without severing a nut from the bar, and the second step is trimming the previously-cut edges of the partly-formed nut-blank and at the same operation severing the nut-blank from the bar.

I am aware that square nuts have heretofore been made from a bar of metal by first punching the round hole (or a series of holes) in the bar and then cutting crude quadrangular nut-blanks therefrom by a die and punch that cut on all four sides of the blank, so as to sever the blank by a cross-cut at one side of the blank and shave the blank by cutting on the three other sides, and the same is hereby disclaimed.

Attempts have been made to make hexagonal nuts from a bar of metal by first punching a round hole (or a series of holes) in the bar and then cutting a blank from the end of the bar by a die and punch that cut on the six sides of the blank; but it was found that in so doing the original round hole was distorted and elongated in the direction of the greatest diameter of the blank. By cutting the opposite edges of the bar to conform to the sides of a hexagonal nut, as in my method, and then cutting a nut-blank from the bar by cutting on all six sides of the blank, so as to merely shave the previously-cut edges, there is no distortion of the round hole, and the blank is smoothly trimmed throughout the major portion of its edges.

I claim as my invention—

1. The herein-described method of making hexagonal nuts which consists in producing a partly-formed nut-blank at one end of a flat bar of metal by cutting its opposite edges on oblique lines corresponding to the confronting edges of two adjoining nut-blanks without thereby severing a nut from the said bar, and then trimming the edges before cut on said oblique lines and at the same operation severing the blank from the bar.

2. The herein-described method of making hexagonal nuts which consists in producing a partly-formed nut-blank at one end of a flat bar of metal by cutting notches therein at its opposite edges in the form of an acute-angled V with a truncated apex, the sides of the said V extending on lines corresponding to the confronting edges of two adjoining nut-blanks, leaving an uncut portion at opposite edges of the said bar to form two parallel side edges of a blank between each successive pair of notches, and then severing the partly-formed nut-blank from the bar and at the same operation trimming the side edges thereof.

GEORGE DUNHAM.

Witnesses:
 GEORGE E. TAFT,
 LOUISE G. LUSK.